(12) United States Patent
Sage et al.

(10) Patent No.: US 12,469,990 B2
(45) Date of Patent: Nov. 11, 2025

(54) CONNECTION HOUSINGS FOR SINGLE-PAIR ETHERNET CABLES AND ASSOCIATED WIRED ETHERNET NETWORKS

(71) Applicant: NEXANS, Courbevoie (FR)

(72) Inventors: Jean-Jacques Sage, Suze-la-Rousse (FR); Didier Willems, Tarcienne (BE); Luc De Bolle, Ternat (BE)

(73) Assignee: NEXANS, Courbevoie (FR)

( * ) Notice: Subject to any disclaimer, the term of this patent is extended or adjusted under 35 U.S.C. 154(b) by 343 days.

(21) Appl. No.: 18/138,835

(22) Filed: Apr. 25, 2023

(65) Prior Publication Data

US 2023/0387611 A1    Nov. 30, 2023

(30) Foreign Application Priority Data

Apr. 28, 2022  (FR) ..................................... 2204009

(51) Int. Cl.
| | |
|---|---|
| *H01R 4/2433* | (2018.01) |
| *H01R 9/05* | (2006.01) |
| *H01R 11/11* | (2006.01) |
| *H01R 12/53* | (2011.01) |
| *H02G 15/113* | (2006.01) |

(52) U.S. Cl.
CPC ........... *H01R 4/2433* (2013.01); *H01R 12/53* (2013.01); *H02G 15/113* (2013.01); *H01R 9/0509* (2013.01); *H01R 11/11* (2013.01)

(58) Field of Classification Search
CPC .... H01R 4/2433; H01R 12/53; H01R 9/0509; H01R 11/11; H02G 15/113

USPC ................................................ 439/78, 76.1
See application file for complete search history.

(56) References Cited

U.S. PATENT DOCUMENTS

2022/0013932 A1    1/2022   Matcha et al.

FOREIGN PATENT DOCUMENTS

| DE | 37 19 088 | | 12/1988 | |
| DE | 3719088 A1 | * | 12/1988 | ........... H02G 15/085 |
| WO | 2021/252938 | | 12/2021 | |
| WO | WO-2021252938 A1 | * | 12/2021 | ......... H01R 13/6658 |

OTHER PUBLICATIONS

French Search Report dated Dec. 1, 2022.

* cited by examiner

*Primary Examiner* — Tulsidas C Patel
*Assistant Examiner* — Jeffrey Mountain
(74) *Attorney, Agent, or Firm* — Sofer & Haroun, LLP (57) ABSTRACT

A connection housing has a main and secondary pair of electrical contacts on a printed circuit board, each having a first and a second electrical contact. A first set of conductive tracks electrically couples the first contacts of the main and secondary pairs, and a second set of tracks electrically couples the second contacts of the main and secondary pairs. The contacts of the main pair are two perforation or insulation displacement contacts receiving transversally and directly connecting two insulated conductors of a same main single-pair Ethernet cable entering and exiting from the housing through two main ways for access to the housing. The contacts of the secondary pair electrically connect two insulated conductors of a same secondary Ethernet cable linked through a secondary way for access to the housing.

18 Claims, 4 Drawing Sheets

CONNECTION HOUSINGS FOR SINGLE-PAIR ETHERNET CABLES AND ASSOCIATED WIRED ETHERNET NETWORKS

RELATED APPLICATION

This application claims the benefit of priority from French Patent Application No. 22 04009, filed on Apr. 28, 2022, the entirety of which is incorporated by reference.

TECHNICAL FIELD

The present invention relates to the general field of so-called single-pair Ethernet cables, and more specifically the connection or bypass housings particularly suited for connecting at least two cables of this type in a wired Ethernet network.

TECHNOLOGICAL BACKGROUND

The SPE (Single-Pair Ethernet) technology is a recent standard using single-pair Ethernet cables to transmit data at speeds ranging up to 1 Gbit per second for a distance of 40 metres and simultaneously ensure the power supply to terminal equipment or devices using the PoDL (Power over Data Line) technology or the SPoE (Single-Pair Power over Ethernet) technology, unlike the conventional LAN networks which use 4-pair LAN cables and conventional RJ45 connectors.

With the explosion of the Internet of Things, it will be increasingly necessary to be able to connect, within a same wired Ethernet network, a large number of devices such as temperature, presence, humidity, brightness or access control sensors, or cameras, or even devices for controlling and powering LED lighting.

The document WO 2021/252938 A1 discloses a wired Ethernet network with a Bus architecture between a data and power source and a termination, using a three-way coupling housing to connect each IoT device to the Bus, according to a daisy-chain architecture pattern. The Bus is thus composed of a plurality of single-pair Ethernet cables provided with end connectors, each end connector being linked to a way of the coupling housing. Each IoT device is, moreover, connected to a third way of the coupling housing via another single-pair Ethernet cable also provided with end connectors.

One drawback with such an architecture lies in the fact that all the single-pair cables used must be provided with end connectors that can be coupled with a connector in the housing, which makes the task of installing a network comprising a large number of IoT devices, and/or adding any new device in an existing network, tedious. Furthermore, in the case of the addition of an IoT device in an existing network, the Bus must be interrupted during the addition operation, rendering the other devices already connected unusable throughout the intervention time.

Moreover, the standards relating to the architectures of wired SPE networks require any cable derived from the Bus to have a maximum length of cm, which further complicates the installation and the possibilities of connecting IoT devices. For example, in the case of the architecture described in the document WO 2021/252938 A1, any IoT device will have to be placed in proximity to the main Bus and the coupling housing allowing this device to be linked to the Bus.

SUMMARY OF THE INVENTION

The aim of the present invention is to mitigate one or more of the abovementioned limitations of the known solutions.

The subject of the present invention is a connection housing for single-pair Ethernet cables, said connection housing comprising:
- a base and a removable cover delimiting, with the base, an internal housing;
- at least one printed circuit board extending in the internal housing parallel to the base;
- at least one first main pair of electrical contacts and a first secondary pair of electrical contacts borne by said at least one printed circuit board, each pair of electrical contacts comprising a first electrical contact and a second electrical contact;
- a first set of conductive tracks borne by said at least one printed circuit board and electrically coupling the first electrical contacts of the first main pair and of the first secondary pair, and a second set of conductive tracks borne by said at least one printed circuit board and electrically coupling the second electrical contacts of the first main pair and of the first secondary pair; and
- a first and a second main way for access to the housing, and a first secondary way for access to the housing, wherein the first and the second electrical contacts of the first main pair are two perforation or insulation displacement contacts extending at right angles above said at least one printed circuit board and configured to transversely receive and directly electrically connect two insulated conductors of a same main single-pair Ethernet cable entering and exiting from the housing through the two main ways for access to the housing, said connection housing further comprising a first and a second metal connection elements borne by and extending at right angles above said at least one printed circuit board, and an additional set of conductive tracks borne by said at least one printed circuit board and electrically coupling together the metal connection elements, each first and second metal connection element being positioned between a main access way and said first main pair of perforation or insulation displacement contacts and forming a cradle to transversely receive said main single-pair Ethernet cable; and the first and the second electrical contacts of the first secondary pair are configured to electrically connect two insulated conductors of a same secondary Ethernet cable linked through said first secondary way for access to the housing.

The connection housing can thus be grafted very easily onto any single-pair Ethernet cable forming a main connection bus in an Ethernet network.

In possible embodiments, the first and the second electrical contacts of the first secondary pair are in the form of a connector capable of cooperating with a connector provided at an end of said secondary Ethernet cable.

In possible embodiments, the first and the second electrical contacts of the first secondary pair are two perforation or insulation displacement contacts extending at right angles above said at least one printed circuit board, so as to transversely receive and directly electrically connect the two insulated conductors of said secondary Ethernet cable, said connection housing comprising a third metal connection element borne by and extending at right angles above said at least one printed circuit board, and coupled electrically to the additional set of conductive tracks, said third metal connection element being positioned between the first secondary access way and the first secondary pair of perforation or insulation displacement contacts and forming a cradle to transversely receive said secondary Ethernet cable.

In possible embodiments, the connection housing comprises a second main pair of electrical contacts between the first main pair of electrical contacts and the second metal connection element, the first and the second electrical contacts of the second main pair being two perforation or insulation displacement contacts extending at right angles above said at least one printed circuit board, the contacts of the two main pairs being configured to transversely receive and directly electrically connect two insulated conductors of two discontinuous segments of said same main single-pair Ethernet cable entering and exiting respectively through the first main way and the second main way.

In possible embodiments, the sets of conductive tracks are borne by a face of said at least one printed circuit board opposite that bearing the perforation or insulation displacement contacts.

In possible embodiments, the first electrical contact of the second main pair is coupled electrically to the first set of conductive tracks, and the second electrical contact of the second main pair is coupled electrically to the second set of conductive tracks.

In these embodiments, said at least one printed circuit board further preferably bears an impedance matching circuit with passive elements linked between the first set and the second set of conductive tracks and associated with each pair of perforation or insulation displacement contacts.

In possible embodiments, said at least one printed circuit board further bears a circuit forming a bus termination load, connected in series with the first set and the second set of conductive tracks, and the connection housing comprises a metal part secured mechanically to the second metal connection element, said metal part being configured to deactivate, respectively activate, the circuit forming the termination load according to whether a cable is present, respectively not present, in the cradle formed by the second metal connection element.

In possible embodiments, the connection housing comprises a second secondary pair of electrical contacts borne by said at least one printed circuit board and comprising a first electrical contact and a second electrical contact, a third set of conductive tracks borne by said at least one printed circuit board and electrically coupling the first electrical contacts of the second main pair and of the second secondary pair, and a fourth set of conductive tracks borne by said at least one printed circuit board and electrically coupling the second electrical contacts of the second main pair and of the second secondary pair.

In these embodiments, said at least one printed circuit board further preferably bears a first impedance matching circuit with passive elements linked between the first set and the second set of conductive tracks, and a second impedance matching circuit with passive elements linked between the third set and the fourth set of conductive tracks.

Here again, the sets of conductive tracks can be borne by a face of said at least one printed circuit board opposite that bearing the perforation or insulation displacement contacts.

In possible embodiments, the connection housing comprises a second secondary way for access to the housing, and the first and the second electrical contacts of the first secondary pair and of the second secondary pair are configured to electrically connect two insulated conductors to the respective ends of a same secondary single-pair Ethernet cable linked through the first and the second secondary ways to form a bypass loop.

The invention relates also to the use of the connection housing to produce different variants of wired single-pair Ethernet networks.

BRIEF DESCRIPTION OF THE FIGURES

The description which follows in light of the attached drawings, given as nonlimiting examples, will give a good understanding of what the invention consists of and how it can be produced. In the attached figures.

DESCRIPTION OF EMBODIMENTS

In the figures, the elements that are identical or equivalent will bear the same reference symbols. The various diagrams are not to scale.

The different figures represent the invention applied to the nonlimiting case in which all the Ethernet cables used are single-pair shielded cables.

Figure 1:
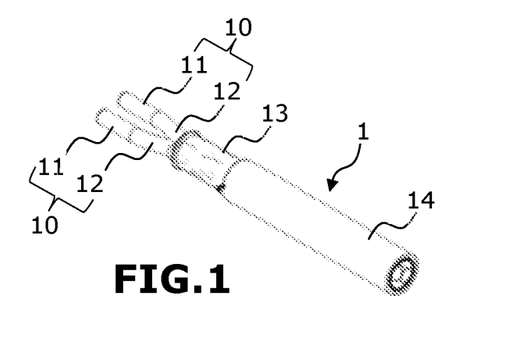
FIG. 1 illustrates a single-pair shielded Ethernet cable.

Referring to FIG. 1, such a single-pair shielded Ethernet cable 1 conventionally comprises two conductors 10. Each conductor 10 is insulated and conventionally comprises a wire or a central core 11 of several wires, for example made of copper, surrounded concentrically with a layer of insulation 12 over the entire length of the conductor. The pair of conductors 10, preferably twisted, is surrounded concentrically over its entire length by a shielding layer 13, for example in the form of a screen or a metal braid. The assembly is conventionally protected by an insulating sheath 14 forming the outer jacket of the cable 1. The construction of the cable 1 represented in FIG. 1 is the same for all the cables 1a, 1b or 1c which will be described hereinbelow.

An exemplary realization of a connection housing 2 according to a first embodiment of the invention will now be described with reference to FIGS. 2 and 3.

The housing 2 comprises a base 20 and a removable cover 21. The removable cover 21 delimits, with the base 20, an internal housing inside which at least one printed circuit board 22 extends parallel to the base 20.

Figure 3:
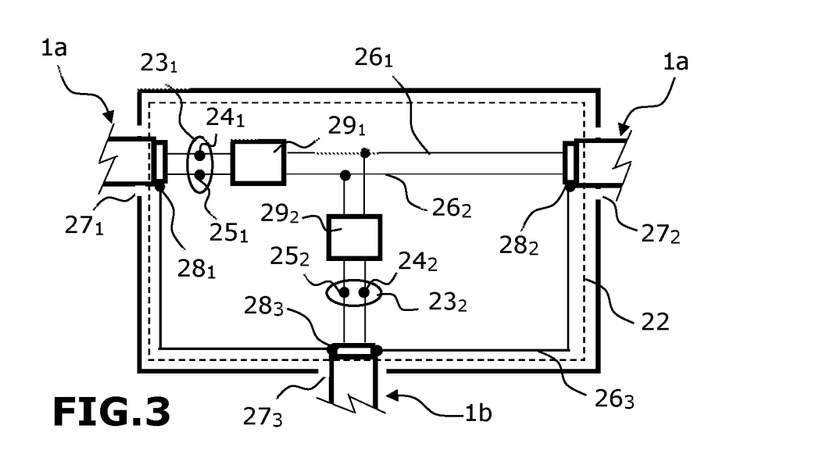
FIG. 3 schematically represents the electrical connections for the elements internal to the housing of FIG. 2.

Said at least one printed circuit board 22 bears at least one first main pair $23_1$ of electrical contacts and a first secondary pair $23_2$ of electrical contacts (see FIG. 3). Each pair of electrical contacts comprises a first electrical contact $24_1$, $24_2$ and a second electrical contact $25_1$, $25_2$.

Said at least one printed circuit board 22 also bears a first set $26_1$ of conductive tracks and a second set $26_2$ of conductive tracks (see FIG. 3). The first set $26_1$ of conductive tracks electrically couples the first electrical contacts $24_1$, $24_2$ of the first main pair $23_1$ and of the first secondary pair $23_2$. The second set $26_2$ of conductive tracks electrically couples the second electrical contacts $25_1$, $25_2$ of the first main pair $23_1$ and of the first secondary pair $23_2$.

The connection housing 2 further comprises three ways for access to the housing, namely a first main way $27_1$ and a second main way $27_2$ for access to the housing, and a secondary way $27_3$ for access to the housing. Preferably, the two main ways $27_1$ and $27_2$ for access to the housing 2 are substantially aligned with the first main pair $23_1$ of electrical contacts, and the secondary way $27_3$ for access to the housing is substantially aligned with the first secondary pair $23_2$ of electrical contacts. Each of the three ways $27_1$ to $27_3$ can be produced in the form of an opening passing through a wall of the base 20, or, as schematically represented in FIG. 2, an opening passing through a wall of the removable cover 21. In a variant that is not represented, the removable cover 21 and the base 20 can have walls that cooperate together to form the three access ways.

Figure 2:
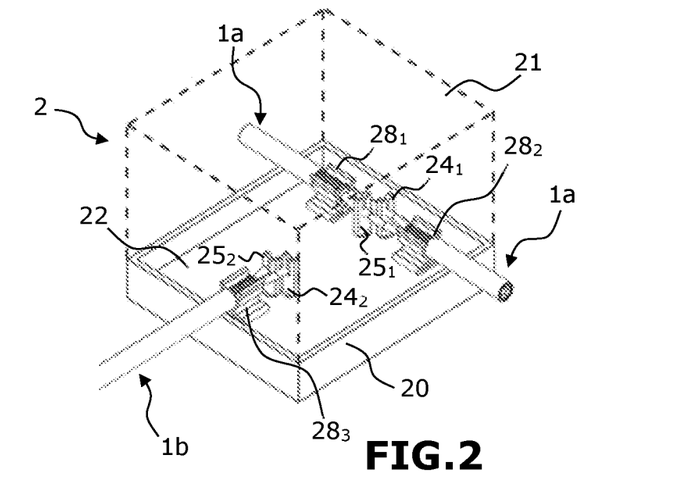
FIG. 2 schematically illustrates a connection housing according to a first embodiment according to the invention.

According to the invention, at least the first and the second electrical contacts $24_1$, $25_1$ of the first main pair $23_1$ are two perforation or insulation displacement contacts extending at right angles above said at least one printed circuit board 22 and configured to transversely receive and directly electrically connect two insulated conductors of a same cable, such as the single-pair Ethernet cable 1a represented in FIGS. 2 and 3, which enters into the housing 2 through the first main way $27_1$ and which exits from the housing 2 without discontinuity through the second main way $27_2$.

A perforation or insulation displacement contact is a self-stripping contact that makes it possible to establish, very simply, with or without specific tools, an electrical contact with the conductive core of an insulated conductor. In the nonlimiting variants represented in the figures, the contacts are insulation displacement contacts which conventionally comprise a metal blade in the form of a U, the base of which rests on the printed circuit board 22, and of which the branches of the U transversely receive an insulated conductor and laterally exert a pressure on the conductor so as to cut the insulating layer and establish the electrical contact. The insulation displacement contacts can be replaced by insulation perforation contacts.

Said at least one printed circuit board 22 also bears a first metal connection element $28_1$ and a second metal connection element $28_2$ which extend at right angles above said at least one printed circuit board 22. The first metal connection element $28_1$ is positioned, preferably in alignment, between the first main access way $27_1$ and said first main pair $23_1$ of perforation or insulation displacement contacts. The second metal connection element $28_2$ is positioned, preferably in alignment, between the second main access way $27_2$ and this same first main pair $23_1$ of perforation or insulation displacement contacts. Each metal connection element $28_1$, $28_2$ forms a cradle to transversely receive the main cable 1a, as visible in FIG. 2.

Said at least one printed circuit board 22 also bears an additional set $26_3$ of conductive tracks which electrically couples together the metal connection elements $28_1$, $28_2$. The three sets $26_1$ to $26_3$ of conductive tracks are preferably borne by a face of said at least one printed circuit board 22 opposite that bearing the perforation or insulation displacement contacts and the metal connection elements, the electrical connection being made conventionally by metallized vias passing through the printed circuit board or any equivalent means.

The two main ways $27_1$ and $27_2$ are preferably borne by a first and a second opposite face of the housing 2 and the secondary way $27_3$ is then borne by a third face contiguous to the first and second faces. That makes it possible to optimize the tracks by producing conductive tracks in the form of a T for each of the first and second sets $26_1$ and $26_2$ of tracks.

In the nonlimiting example represented in FIGS. 2 and 3, the first and the second electrical contacts $24_2$, $25_2$ of the first secondary pair $23_2$ are also two perforation or insulation displacement contacts extending at right angles above said at least one printed circuit board 22, transversely receiving and electrically connecting two insulated conductors situated at an end of a secondary single-pair Ethernet cable, such as the secondary cable 1b of FIG. 2 entering through the secondary access way $27_3$. Said at least one printed circuit board 22 also bears a third metal connection element $28_3$ extending at right angles above said at least one printed circuit board 22, and coupled electrically to the third set $26_3$ of conductive tracks, said third metal connection element $28_3$ being positioned, preferably in alignment, between the secondary access way $27_3$ and said first secondary pair $23_2$ of perforation or insulation displacement contacts. In a way similar to the first and second metal connection elements $28_1$, $28_2$, the third metal connection element $28_3$ forms a cradle to transversely receive an end of the secondary cable 1b.

As can be seen in FIG. 3, which schematically represents the electrical connections on the bottom face of the board 22, said at least one printed circuit board 22 further preferably bears two impedance matching circuits $29_1$, $29_2$ with passive elements, the first circuit $29_1$ being linked between the first set $26_1$ and the second set $26_2$ of conductive tracks and associated with the first main pair $23_1$ of perforation or insulation displacement contacts, the second circuit $29_2$ being linked between the first set $26_1$ and the second set $26_2$ of conductive tracks and associated with the first secondary pair $23_2$ of perforation or insulation displacement contacts. These two circuits bear the single reference 29 in the example of FIG. 8. These impedance matching circuits $29_1$ and $29_2$ make it possible to obtain a controlled impedance corresponding to the cables 1a and 1b used, for example of 100 Ohms.

In a variant that is not represented, the first and the second electrical contacts $24_2$, $25_2$ of the first secondary pair $23_2$ could be produced in the form of a connector capable of cooperating with a connector provided at an end of said secondary single-pair Ethernet cable 1b. In this case, the second impedance matching circuit $29_2$ is not necessarily essential.

A variant realization of the connection housing 2 according to the first embodiment according to the invention will now be described with reference to FIGS. 4 and 5.

This other variant differs from that described above with reference to FIGS. 2 and 3 only in that the housing 2 comprises a second main pair $23_3$ of electrical contacts (see FIG. 5), preferably substantially aligned between the first main pair $23_1$ of electrical contacts and the second metal connection element $28_2$, the first and the second electrical contacts $24_3$, $25_3$ of the second main pair $23_3$ being two perforation or insulation displacement contacts extending at right angles above said at least one printed circuit board 22 and configured to transversely receive and directly electrically connect two insulated conductors of said same main single-pair Ethernet cable 1a. In this variant, the main Ethernet cable 1a must be received with discontinuity, as represented in FIG. 4. Thus, the main cable 1a is cut between the first pair $23_1$ and the third pair $23_3$ so as to obtain two discontinuous segments of this main single-pair Ethernet cable 1a, one entering through the first main way $27_1$ and the other exiting through the second main way $27_2$. The insulated conductors of the free end of the first segment are thus received by the two contacts $24_1$ and $25_1$ of the first main pair $23_1$, while the same insulated conductors of the free end of the second segment are received by the two contacts $24_3$ and $25_3$ of the second main pair $23_3$. In this case, said printed circuit board 22 further preferably bears a third impedance matching circuit $29_3$ with passive elements, linked between the first set $26_1$ and the second set $26_2$ of conductive tracks and associated with the second main pair $23_3$ of perforation or insulation displacement contacts (see FIG. 5).

In the two preceding variants, the main cable 1a or each of the two discontinuous segments of this main cable (when the latter is cut) is partially stripped, on the one hand, of its insulating sheath (14 in FIG. 1) and of its shielding layer (13 in FIG. 1) over a portion intended to be received by the first or the second main pair in order for each of its two insulated conductors (10 in FIG. 1) to be able to be received in its associated perforation or insulation displacement contact, and, on the other hand, of its insulating sheath only over its portion intended to be received by the metal elements, in order for its shielding layer to be received in the cradle of the first $28_1$ or of the second $28_2$ metal connection elements of the connection housing 2. These different connection elements and the third set $26_3$ of tracks thus make it possible to connect the shielding layer 13 of the main cable 1a to an electrical ground.

In the case where the first secondary pair $23_2$ also comprises perforation or insulation displacement contacts $24_2$ and $25_2$, the housing 2 can receive, by the secondary access way $27_3$, an end not provided with a connector of the secondary cable 1b. Here again, this end must be previously partially stripped, on the one hand, of its insulating sheath and of its shielding layer over a portion intended to be received by the second pair $23_2$ in order for each of its two insulated conductors to be able to be received in its associated perforation or insulation displacement contact, and, on the other hand, of its sheath only over its portion intended to be received by the metal connection element $28_3$, in order for its shielding layer to be received in the cradle formed by this metal connection element $28_3$.

It should be noted that the connection housing 2 described in its different variants above can also be used to connect a single-pair main cable 1a and a single-pair secondary cable 1b which are both unshielded. In this case, the metal connection elements $28_1$ to $28_3$ have the sole function of ensuring that the cables are well secured mechanically inside the housing 2.

Figure 6:
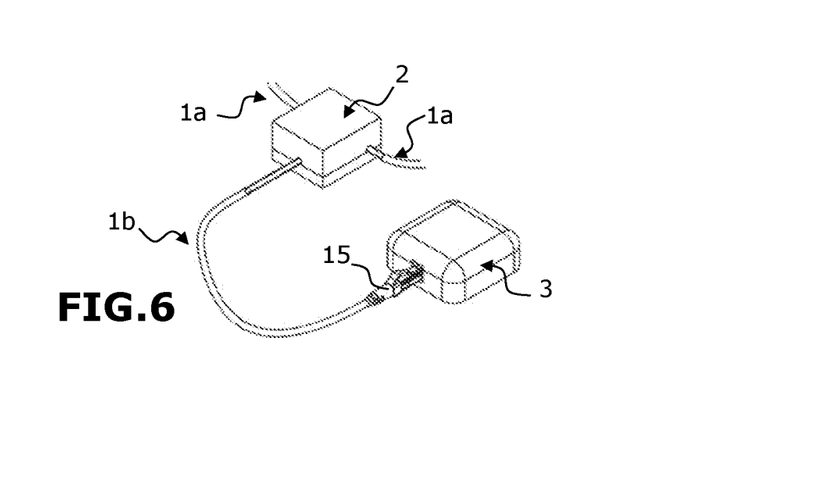
FIG. 6 illustrates an example of connection of an IoT device to a main single-pair cable according to a first possible implementation using the connection housing according to the first embodiment according to the invention.

FIG. 6 illustrates a first way of using the connection housing 2 described above. In this FIG. 6, a main single-pair Ethernet cable 1a is represented, constituting the main bus of a wired Ethernet network. The connection housing 2 is grafted onto this main cable 1a as explained above, either without discontinuity (variant of the housing 2 according to FIG. 2), or after having cut the main cable 1a into two discontinuous segments (variant of the housing 2 according to FIG. 4). For this, the removable cover 21 of the connection housing 2 is removed from the base 20 so as to be able to run the main cable 1a through the two main ways $27_1$ and $27_2$, or, when the main cable 1a has been cut, so as to have the first discontinuous segment enter through the first main access way $27_1$ and the second discontinuous segment exit through the second main access way $27_2$. If the main cable 1a is a shielded cable, this cable 1a (or each end of the discontinuous segments of this main cable 1a) is stripped of its outer sheath and of its shielding layer over a portion of sufficient length to expose the two insulated conductors which are placed respectively in the perforation or insulation displacement contacts of the first main pair $23_1$ and of the second main pair $23_3$. The perforation or insulation displacement contacts are then actuated to perforate the insulating layer of each conductor and establish the electrical connection with the copper wires of these conductors. Furthermore, this cable 1a (or each end of the discontinuous segments of this main cable 1a) is stripped of its outer sheath only over a portion of sufficient length to expose its shielding layer. The latter is then received transversely by and in contact with the cradle formed by the associated metal connection element $28_1$ and $28_2$. An IoT device 3 is connected to the network via a secondary single-pair cable 1b of which a first end is connected to the device 3, for example via a dedicated connector 15 with which this first end is equipped, and the second end of this secondary cable 1b entering into the housing through the secondary access way to be directly connected to the first secondary pair $23_2$ of the housing. If the housing 2 is according to one of the variants represented in FIGS. 2 to 5, the second end of the secondary cable 1b has no connector and must be stripped of its sheath and of its shielding layer over a portion of sufficient length to expose the two insulated conductors of the secondary cable 1b which are placed respectively in the perforation or insulation displacement contacts of the first secondary pair $23_2$. Furthermore, the second end of this secondary cable 1b is also stripped of its outer sheath so as to expose its shielding layer. The latter is then received transversely by and in contact with the cradle formed by the associated metal connection element $28_3$.

Figure 4:
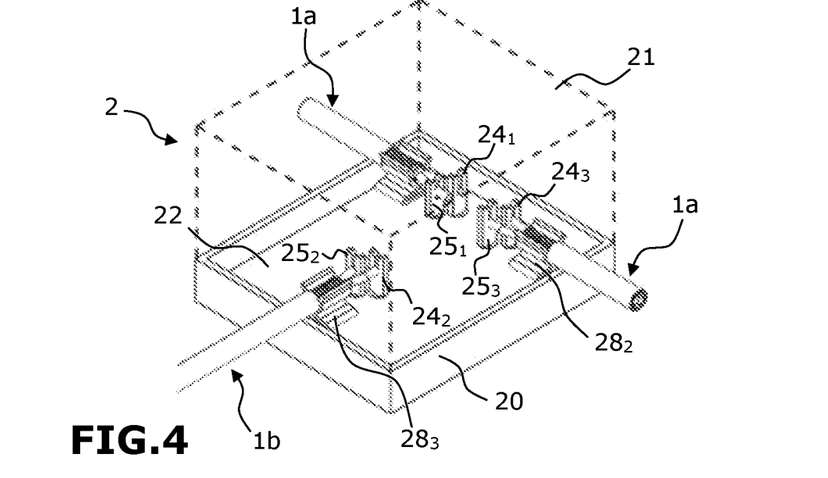
FIG. 4 schematically illustrates a variant of a connection housing according to the first embodiment according to the invention.
Figure 5:
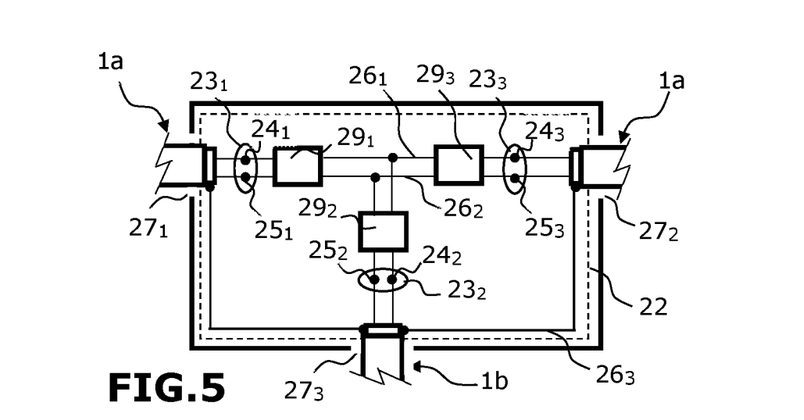
FIG. 5 schematically represents the electrical connections for the elements internal to the housing of FIG. 4.
Figure 7:
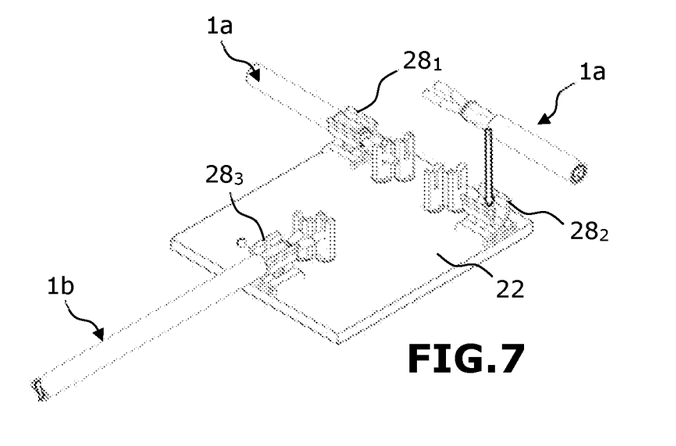
FIG. 7 illustrates a partial view of another variant embodiment of a connection housing according to the first embodiment according to the invention.
Figure 8:
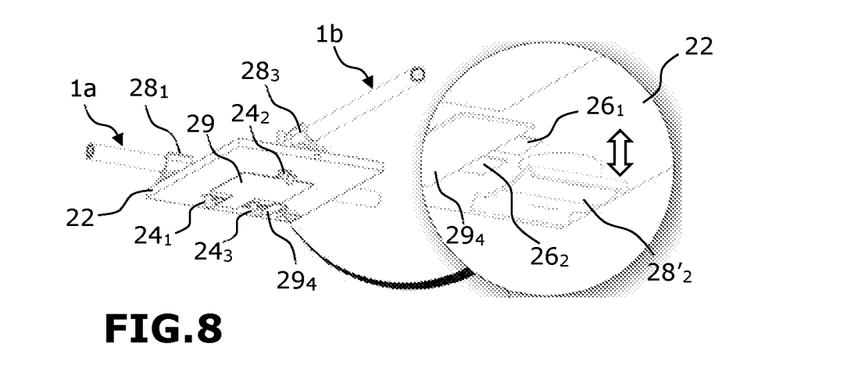
FIG. 8 illustrates another partial view of the housing of FIG. 7 and an enlarged detail of this view.

FIGS. 7 and 8 illustrate a very interesting variant of the connection housing 2 of FIGS. 4 and 5. In this variant, the printed circuit board 22 bears a circuit $29_4$ forming a bus termination load connected in series with the first set $26_1$ and the second set $26_2$ of conductive tracks. A metal part $28'_2$ secured mechanically to the second metal connection element $28_2$ deactivates, respectively activates, this circuit $29_4$ forming the termination load, depending on whether a segment of the main cable 1a is present, respectively not present, in the cradle formed by the second metal connection element $28_2$. The mechanical link between the metal connection element $28_2$ and the metal part $28'_2$ can be a translation, as represented by the double arrow in FIG. 8. FIG. 8 illustrates the case where a segment of cable 1a is present in the cradle $28_2$, such that the circuit $29_4$ forming the termination load is deactivated. When no segment of cable 1a is present in the cradle $28_2$, the metal part $28'_2$ activates the circuit $29_4$ by linking the two sets $26_1$ and $26_2$ of conductive tracks. Thus, one and the same connection housing 2 according to this variant embodiment can be used either to connect an IoT device at any intermediate position of the main bus, or to connect an IoT device at the end of the main bus, in which case the housing 2 also ensures the termination of the bus.

As indicated above, in order to comply with the standard, the length of the secondary cable 1*b* of FIG. 6 cannot exceed 15 cm, which can complicate installation when there is no place to position an IoT device 3 close to the main cable 1*a*.

To resolve this problem, a second embodiment of a connection housing 4 for single-pair Ethernet cables, and its joint use with the connection housing 2 according to the first embodiment described above, will now be described in relation to FIGS. 9 and 10.

Figure 9:
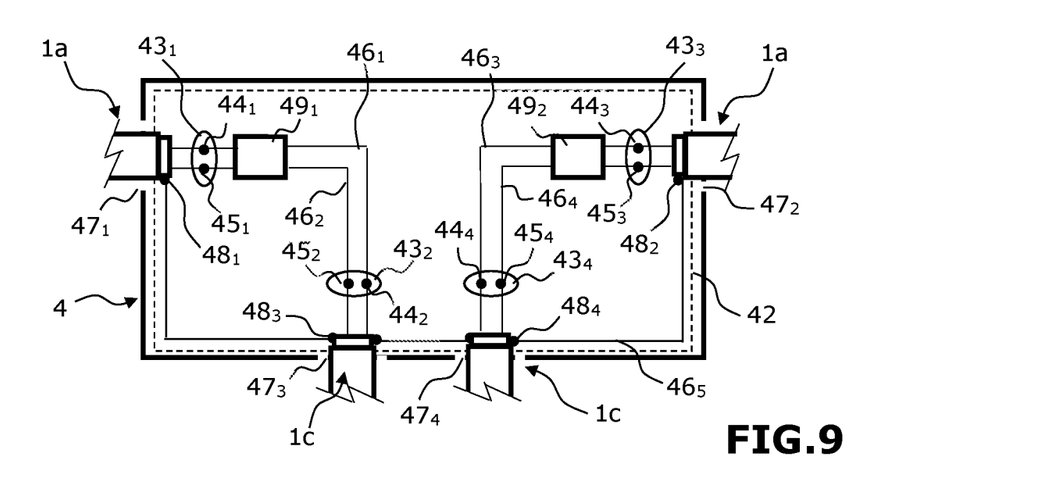
FIG. 9 schematically illustrates the electrical connections for elements internal to a connection housing according to a second embodiment according to the invention.

In a way similar to the connection housing 2, the housing 4 according to this second embodiment comprise a base 40 and a removable cover 41 delimiting, with the base 40, an internal housing, and at least one printed circuit board 42 extending in the internal housing parallel to the base 40.

Said at least one printed circuit board 42 here bears a first main pair $43_1$ of electrical contacts, a first secondary pair $43_2$ of electrical contacts, a second main pair $43_3$ of electrical contacts and a second secondary pair $43_4$ of electrical contacts, each pair of electrical contacts comprising a first electrical contact $44_1$, $44_2$, $44_3$, $44_4$ and a second electrical contact $45_1$, $45_2$, $45_3$, $45_4$.

Said at least one printed circuit board 42 further bears a first set $46_1$ of conductive tracks electrically coupling the first electrical contacts $44_1$, $44_2$ of the first main pair $43_1$ and of the first secondary pair $43_2$, a second set $46_2$ of conductive tracks electrically coupling the second electrical contacts $45_1$, $45_2$ of the first main pair $43_1$ and of the first secondary pair $43_2$, a third set $46_3$ of conductive tracks electrically coupling the first electrical contacts $44_3$, $44_4$ of the second main pair $43_3$ and of the second secondary pair $43_4$, and a fourth set $46_4$ of conductive tracks electrically coupling the second electrical contacts $45_3$, $45_4$ of the second main pair $43_3$ and of the second secondary pair $43_4$.

The connection housing 4 further comprises two main access ways, namely a first main way $47_1$ for access to the housing and a second main way $47_2$ for access to the housing, and two secondary access ways, namely a first secondary way $47_3$ for access to the housing and a second secondary way $47_4$ for access to the housing. The first main way $47_1$ for access to the housing is preferably substantially aligned with the first main pair $43_1$ of electrical contacts. The second main way $47_2$ for access to the housing is preferably substantially aligned with the second main pair $43_3$ of electrical contacts. The first secondary way $47_3$ for access to the housing is preferably substantially aligned with the first secondary pair $43_2$ of electrical contacts. Finally, the second secondary way $47_4$ for access to the housing is preferably substantially aligned with the second secondary pair $43_4$ of electrical contacts.

In a way similar to the connection housing 2, and in accordance with the invention, the first and the second electrical contacts of the pairs associated with the main ways, namely of the first main pair $43_1$ and of the second main pair $43_3$, are two perforation or insulation displacement contacts extending at right angles above said at least one printed circuit board 42 and configured to transversely receive and electrically connect two insulated conductors of two discontinuous segments of a same main single-pair Ethernet cable 1*a* entering and exiting respectively through the first main way $47_1$ and the second main way $47_2$.

Said at least one printed circuit board 42 further bears a first metal connection element $48_1$ and a second metal connection element $48_2$ which extend at right angles above said at least one printed circuit board. The first metal connection element $48_1$ is positioned, preferably in alignment, between the first main access way $47_1$ and the first main pair $43_1$ of perforation or insulation displacement contents. The second metal connection element $48_2$ is positioned preferably in alignment between the second main access way $47_2$ and the second main pair $43_3$ of perforation or insulation displacement contacts. These connection elements are identical to the metal connection elements $28_1$ to $28_3$ of the connection housing 2, and consequently form a cradle to transversely receive the two discontinuous segments of the main cable 1*a*. An additional set $46_5$ of conductive tracks, borne by said at least one printed circuit board 42, electrically couples together the metal connection elements $48_1$, $48_2$.

The sets $46_1$ to $46_5$ of conductive tracks are preferably borne by a face of said at least one printed circuit board 42 opposite that bearing the perforation or insulation displacement contacts and the metal connection elements, the electrical connection being made conventionally by metallized vias passing through the printed circuit board or any equivalent means.

The first and the second electrical contacts of the first secondary pair $43_2$ and of the second secondary pair $43_4$ are configured, for their part, to electrically connect two insulated conductors to the respective ends of a same secondary single-pair Ethernet cable 1*c* linked through the first and the second secondary ways $47_3$, $47_4$ to form a bypass loop 16.

In the nonlimiting example of FIG. 9, the first $44_2$, $44_4$ and the second $45_2$, $45_4$ electrical contacts of the first secondary pair $43_2$ and of the second secondary pair $43_4$ are also perforation or insulation displacement contacts extending at right angles above said at least one printed circuit board 42, so as to transversely and directly electrically connect the two insulated conductors to the ends of the bypass loop 16, and the housing 4 consequently comprises a third $48_3$ and a fourth $48_4$ metal connection element borne by and extending at right angles above said at least one printed circuit board 42, and coupled electrically to the additional set $46_5$ of conductive tracks, the third $48_3$, respectively the fourth $48_4$, metal connection element being positioned, preferably in alignment, between the first $47_3$, respectively the second $47_4$, secondary access way and the first $43_2$, respectively the second $43_4$, associated secondary pair of perforation or insulation displacement contacts and forming a cradle to transversely receive the ends of the secondary single-pair cable 1*c* forming the bypass loop 16.

In a variant that is not represented, the first $44_2$, $44_4$ and the second $45_2$, $45_4$ electrical contacts of the first secondary pair $43_2$ and of the second secondary pair $43_4$ could be produced in the form of connectors capable of cooperating with a connector provided at each end of said secondary single-pair Ethernet cable 1*c*.

As can be seen in FIG. 9, which schematically represents the electrical connections on the bottom face of the printed circuit board 42, said at least one printed circuit board 42 further preferably bears a first impedance matching circuit $49_1$ with passive elements linked between the first set $46_1$ and the second set $46_2$ of conductive tracks, and a second impedance matching circuit $49_2$ with passive elements linked between the third set $46_3$ and the fourth set $46_4$ of conductive tracks. Here again, these circuits $49_1$ and $49_2$ make it possible to obtain a controlled impedance corresponding to the cables 1*a* and 1*c* linked to the connection housing 4, for example an impedance of 100 Ohms.

Thus, in a way similar to what was described with reference to FIG. 6, here it is the connection housing 4 which is grafted onto the main cable 1*a* constituting the main bus of an Ethernet network, after having cut this main cable 1a into two discontinuous segments. For this, the removable cover 41 of the connection housing 4 is removed from the base 40 so as to have the first discontinuous segment of the cut main cable 1a enter through the first main access way $47_1$ and the second discontinuous segment of the cut main cable 1a exit through the second main access way $47_2$. If the main cable 1a is a shielded cable, each end of the discontinuous segments of this main cable 1a is stripped of its outer sheath and of its shielding layer over a portion of sufficient length to expose the two insulated conductors which are placed respectively in the perforation or insulation displacement contacts of the first main pair $43_1$ and of the second main pair $43_3$. The perforation or insulation displacement contacts are then actuated to perforate the insulating layer of each conductor and establish the electrical connection with the copper wires of these conductors. Furthermore, each end of the discontinuous segments of this main cable 1a is stripped of its outer sheath only over a portion of sufficient length to expose its shielding layer. The latter is then received transversely by and in contact with the cradle formed by the associated metal connection element $48_1$ and $48_2$. The same procedure is applied to connect the two ends of the secondary cable 1c forming the bypass loop to the two other secondary pairs $43_2$ and $43_4$ of contacts.

Figure 10:
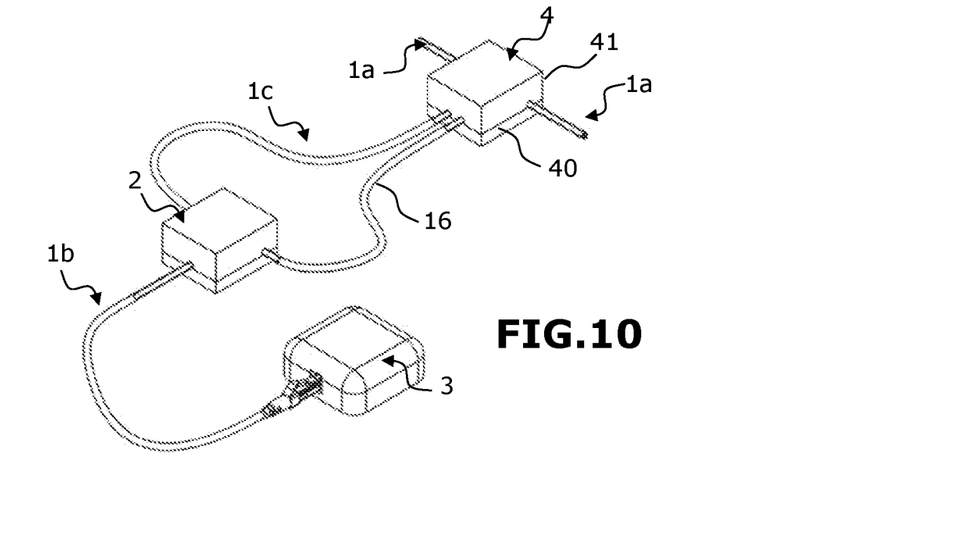
FIG. 10 illustrates an example of connection of an IoT device to a main single-pair cable according to a third possible embodiment using a connection housing according to the first embodiment and a connection housing according to the second embodiment according to the invention.

The assembly obtained (bypass loop 16 linked to the connection housing 4, itself linked to the main cable 1a) is used advantageously in association with the connection housing 2 according to the first embodiment, as represented in Figure in order to solve the situation in which the device 3 is situated at more than cm from the main cable 1a. Here, the connection housing 2 (to which the device 3 is linked by the single-pair secondary cable 1b) is not grafted onto the main cable 1a, but onto the bypass loop 16. For example, the first and the second electrical contacts $24_1$, $25_1$ of the first main pair $23_1$ of the connection housing 2 are in direct electrical connection with the two insulated conductors of said bypass loop 16 entering and exiting from the connection housing 2 through its two main ways $27_1$ for access to the connection housing 2.

Other variant productions of a housing 4 according to the second embodiment of the invention can be envisaged. For example, a single secondary way for access to the housing 4 could be envisaged, instead of the two secondary access ways $47_3$ and $47_4$ of FIG. 9. In this case, the secondary cable 1c can be a cable comprising two pairs, one for connection to the first secondary pair $43_2$, the other for connection to the second secondary pair $43_4$. The housing 2 must then be adapted for it to be able to be connected to this two-pair cable.

Figure 11:
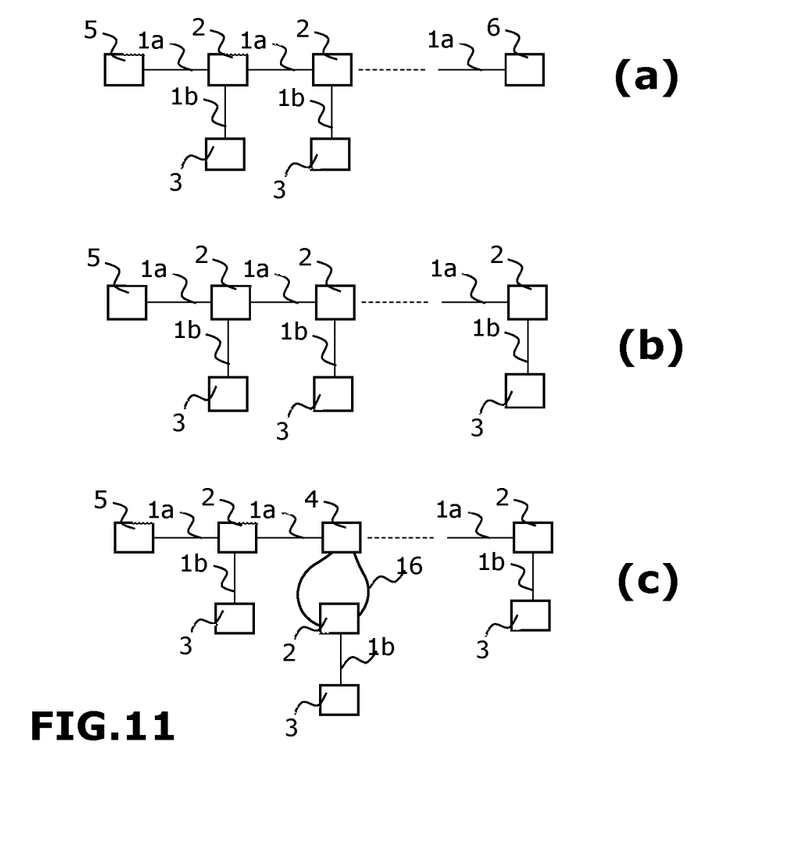
FIG. 11 illustrates three examples of Ethernet networks with single-pair cables using the connection housing in its different embodiments according to the invention.

As nonlimiting examples, the views (a) to (c) of FIG. 11 illustrate different wired Ethernet networks using the three-way connection housing, even the connection housing 4 (bypass) that are the subjects of the invention. For each view (a) to (c), the wired Ethernet network comprises a main single-pair Ethernet cable 1a (shielded or not) forming a main bus linking a source of data and of power 5 to a termination.

In the case of the view (a), two connection housings 2 according to the first embodiment of the invention are grafted onto the main cable 1a in two intermediate positions of the cable and are used to each directly connect an IoT device 3 via a secondary cable 1b. The termination is made by a dedicated device 6.

The network of the view (b) differs from that of the view (a) in that the termination is produced via a connection housing 2 according to the variant described with reference to FIGS. 7 and 8, being also used to directly connect an additional IoT device 3 via a secondary cable 1b.

The network of the view (c) differs from that of the view (b) in that one of the three-way connection housings 2 has been replaced by a connection housing 4 according to the second embodiment of the invention, and that the corresponding device 3 is connected to a connection housing 2 which, in turn, is grafted onto the bypass loop 16 connected to the connection housing 4, via a connection housing 2 according to the first embodiment, as described with reference to FIG. 10.

In all the cases, the fact of providing housings 2 or 4 of the invention, provided with pairs of perforation or insulation displacement contacts and configured to be grafted onto the single-pair main cable 1a, makes it possible to easily add IoT devices. The networks and housings can be adapted for example to operate up to frequencies of 200 MHz, on a transmission channel of type T1-M-A-25 and/or T1-M-A-50 defined by ISO/IEC JTC SC25.

The invention claimed is:

1. A connection housing for single-pair Ethernet cables, said connection housing comprising:
   a base and a removable cover delimiting with the base an internal housing;
   at least one printed circuit board extending in the internal housing parallel to the base;
   at least one main pair of electrical contacts and a first secondary pair of electrical contacts borne by said at least one printed circuit board, each pair of electrical contacts comprising a first electrical contact and a second electrical contact;
   a first set of conductive tracks borne by said at least one printed circuit board and electrically coupling the first electrical contacts of the first main pair and of the first secondary pair, and a second set of conductive tracks borne by said at least one printed circuit board and electrically coupling the second electrical contacts of the first main pair and of the first secondary pair; and
   a first and a second main way for access to the housing, and a first secondary way for access to the housing,
   wherein the first and the second electrical contacts of the first main pair are two perforation or insulation displacement contacts extending at right angles above said at least one printed circuit board and configured to transversely receive and directly electrically connect two insulated conductors of a same main single-pair Ethernet cable entering and exiting from the housing by the two main ways for access to the housing, said connection housing further comprising a first and a second metal connection element borne by and extending at right angles above said at least one printed circuit board, each first and second metal connection element being positioned between a main access way and said first main pair of perforation or insulation displacement contacts,
   wherein each first and second metal connection element forms a cradle to transversely receive said main single-pair Ethernet cable, and in that the connection housing further comprises an additional set of conductive tracks borne by said at least one printed circuit board and electrically coupling together the metal connection elements, and in that said at least one printed circuit board further bears an impedance matching circuit with passive elements linked between the first set and the second set of conductive tracks.

2. The connection housing according to claim 1, wherein the first and the second electrical contacts of the first secondary pair are in the form of a connector capable of cooperating with a connector provided at an end of said secondary Ethernet cable.

3. The connection housing according to claim 1, wherein the first and the second electrical contacts of the first secondary pair are two perforation or insulation displacement contacts extending at right angles above said at least one printed circuit board, so as to transversally receive and directly electrically connect the two insulated conductors of said secondary Ethernet cable, said connection housing comprising a third metal connection element borne by and extending at right angles above said at least one printed circuit board, and electrically coupled to the additional set of conductive tracks, said third metal connection element being positioned between the first secondary access way and the first secondary pair of perforation or insulation displacement contacts and forming a cradle to transversely receive said secondary Ethernet cable.

4. The connection housing according to claim 1, comprising a second main pair of electrical contacts between the first main pair of electrical contacts and the second metal connection element, the first and the second electrical contacts of the second main pair being two perforation or insulation displacement contacts extending at right angles above said at least one printed circuit board, the contacts of the two main pairs being configured to transversely receive and directly electrically connect two insulated conductors of two discontinuous segments of said same main single-pair Ethernet cable entering and exiting respectively through the first main way and the second main way.

5. The connection housing according to claim 4, wherein the sets of conductive tracks are borne by a face of said at least one printed circuit board opposite that bearing the perforation or insulation displacement contacts.

6. The connection housing according to claim 4, wherein the first electrical contact of the second main pair is coupled electrically to the first set of conductive tracks, and the second electrical contact of the second main pair is coupled electrically to the second set of conductive tracks.

7. The connection housing according to claim 6, wherein said impedance matching circuit with passive elements is associated with each pair of perforation or insulation displacement contacts.

8. The connection housing according to claim 6, wherein said at least one printed circuit board further bears a circuit forming a bus termination load, connected in series with the first set and the second set of conductive tracks, and in that the connection housing comprises a metal part secured mechanically to the second metal connection element, said metal part being configured to deactivate, respectively activate, the circuit forming the termination load according to whether a cable is present, respectively not present, in the cradle formed by the second metal connection element.

9. The connection housing according to claim 4, comprising a second secondary pair of electrical contacts borne by said at least one printed circuit board and comprising a first electrical contact and a second electrical contact, a third set of conductive tracks borne by said at least one printed circuit board and electrically coupling the first electrical contacts of the second main pair and of the second secondary pair, and a fourth set of conductive tracks borne by said at least one printed circuit board and electrically coupling the second electrical contacts of the second main pair and of the second secondary pair.

10. The connection housing according to claim 9, wherein said at least one printed circuit board further bears a second impedance matching circuit with passive elements linked between the third set and the fourth set of conductive tracks.

11. The connection housing according to claim 10, wherein the sets of conductive tracks are borne by a face of said at least one printed circuit board opposite that bearing the perforation or insulation displacement contacts.

12. The connection housing according to claim 9, comprising a second secondary way for access to the housing, and wherein the first and the second electrical contacts of the first secondary pair and of the second secondary pair are configured to electrically connect two insulated conductors to the respective ends of a same secondary single-pair Ethernet cable linked to the first and the second secondary ways to form a bypass loop.

13. A wired Ethernet network comprising:
a main single-pair Ethernet cable comprising, inside an outer insulating sheath, a pair of insulated conductors capable of transmitting data and power, said main cable having its two ends linked respectively between a source of data and of power and a termination;
at least one device capable of receiving the data and the power from the main single-pair Ethernet cable; and
a secondary single-pair Ethernet cable comprising, inside an outer insulating sheath, a pair of insulated conductors capable of transmitting data and power, a first end of the secondary cable being connected electrically to said device;
wherein said wired Ethernet network comprises said connection housing according to claim 1 being a first connection housing, connected in the network such that said main single-pair Ethernet cable enters and exits from the first connection housing respectively through the first and the second main ways for access to the first housing, by being received transversely by the cradle of the first and of the second metal connection elements, the two insulated conductors of the main single-pair Ethernet cable being electrically connected with the first and the second electrical contacts of the first main pair, and in that the two insulated conductors of the second end of said secondary single-pair Ethernet cable are linked electrically, through the first secondary way for access to the first housing, to the first and the second electrical contacts of the first secondary pair.

14. The wired Ethernet network according to claim 13, wherein the main single-pair Ethernet cable comprises, inside the insulating outer sheath, a shielding layer surrounding the two insulated conductors, and in that the main single-pair Ethernet cable is stripped of its insulating outer sheath in order for the shielding layer to be in contact with the cradles of the first and second metal connection elements of the first connection housing.

15. The wired Ethernet network according to claim 13, wherein the first connection housing includes a second main pair of electrical contacts between the first main pair of electrical contacts and the second metal connection element, the first and the second electrical contacts of the second main pair being two perforation or insulation displacement contacts extending at right angles above said at least one printed circuit board, the contacts of the two main pairs being configured to transversely receive and directly electrically connect two insulated conductors of two discontinuous segments of said same main single-pair Ethernet cable entering and exiting respectively through the first main way and the second main way,
and in that the main single-pair Ethernet cable is cut into two discontinuous segments, the contacts of the first main pair receiving transversally and directly electrically connecting the two insulated conductors of the discontinuous segment entering through the first main way and the contacts of the second main pair receiving transversely and directly electrically connecting the two insulated conductors of the discontinuous segment exiting through the second main way.

16. The wired Ethernet network according to claim 15, wherein said termination is produced by a second connection housing, wherein in said second connection housing, said at least one printed circuit board further bears a circuit forming a bus termination load, connected in series with the first set and the second set of conductive tracks, and in that the connection housing comprises a metal part secured mechanically to the second metal connection element, said metal part being configured to deactivate, respectively activate, the circuit forming the termination load according to whether a cable is present, respectively not present, in the cradle formed by the second metal connection element, of which the circuit forming the termination load is activated.

17. The wired Ethernet network comprising:
a main single-pair Ethernet cable comprising, inside an outer insulating sheath, a pair of insulated conductors capable of transmitting data and power, said main cable having its two ends linked respectively between a source of data and of power and a termination;
at least one device capable of receiving the data and the power from the main single-pair Ethernet cable; and
a secondary single-pair Ethernet cable comprising, inside an outer insulating sheath, a pair of insulated conductors capable of transmitting data and power, a first end of the secondary cable being connected electrically to said device;
wherein said wired Ethernet network comprises said connection housing according to claim 1 being a first connection housing, a second secondary single-pair Ethernet cable comprising, inside an outer insulating sheath, a pair of insulated conductors capable of transmitting data and power, and a second connection housing having a second secondary way for access to the housing, and wherein the first and the second electrical contacts of the first secondary pair and of the second secondary pair are configured to electrically connect two insulated conductors to the respective ends of a same secondary single-pair Ethernet cable linked to the first and the second secondary ways to form a bypass loop, connected in the network such that:
the first and the second electrical contacts of the first main pair and of the second main pair of the second connection housing are directly electrically connected to the two insulated conductors of two discontinuous segments of said main single-pair Ethernet cable entering and exiting respectively through the first main way and the second main way of said second housing;
the first and the second electrical contacts of the first secondary pair and of the second secondary pair of the second connection housing are directly electrically connected to the two insulated conductors at the respective ends of said second secondary single-pair Ethernet cable through the first and the second secondary ways so as to form a bypass loop;
said bypass loop enters and exits from the first connection housing respectively through the first and the second main ways for access to the first housing, by being received transversely by the cradle of the first and of the second metal connection elements, the two insulated conductors of the bypass loop being electrically connected with the first and the second electrical contacts by the first main pair, and
the two insulated conductors of the second end of said secondary single-pair Ethernet cable are linked electrically, through the first secondary way for access to the first housing, to the first and the second electrical contacts of the first secondary pair of the first housing.

18. The wired Ethernet network according to claim 17, wherein the main single-pair Ethernet cable comprises, inside the outer insulating sheath, a shielding layer surrounding the two insulated conductors, and in that each discontinuous segment of the main single-pair Ethernet cable is stripped of its sheath in order for the shielding layer to be in contact with the cradle of the first or of the second metal connection elements of the second connection housing.

* * * * *